(12) United States Patent
Clark et al.

(10) Patent No.: US 11,390,059 B2
(45) Date of Patent: Jul. 19, 2022

(54) DECORATIVE ARTICLE FEATURING A MICROSCOPIC PERIODIC PATTERN AND METHODS OF MAKING THE SAME

(71) Applicant: 3M INNOVATIVE PROPERTIES COMPANY, St. Paul, MN (US)

(72) Inventors: John C. Clark, Maplewood, MN (US); Samad Javid, Woodbury, MN (US); Vivek Krishnan, St. Paul, MN (US); Alexander J. Kugel, Woodbury, MN (US); Aaron K. Nienaber, Maplewood, MN (US); Chris A. Pommer, Woodbury, MN (US); Christopher B. Walker, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 173 days.

(21) Appl. No.: 15/775,083

(22) PCT Filed: Dec. 14, 2016

(86) PCT No.: PCT/US2016/066471
§ 371 (c)(1),
(2) Date: May 10, 2018

(87) PCT Pub. No.: WO2017/106239
PCT Pub. Date: Jun. 22, 2017

(65) Prior Publication Data
US 2018/0319204 A1 Nov. 8, 2018

Related U.S. Application Data

(60) Provisional application No. 62/269,413, filed on Dec. 18, 2015.

(51) Int. Cl.
*B32B 5/16* (2006.01)
*B32B 7/12* (2006.01)
*B32B 27/14* (2006.01)

(52) U.S. Cl.
CPC ............... *B32B 27/14* (2013.01); *B32B 5/16* (2013.01); *B32B 7/12* (2013.01); *B32B 2451/00* (2013.01)

(58) Field of Classification Search
CPC .......... B32B 5/16; B32B 7/12; B32B 37/025; B32B 2307/418; B32B 2451/00; B44C 1/18; B44C 1/1725; B44C 1/1756
See application file for complete search history.

(56) References Cited

U.S. PATENT DOCUMENTS

| 4,564,556 A | 1/1986 | Lange |
| 4,849,265 A | 7/1989 | Ueda |

(Continued)

FOREIGN PATENT DOCUMENTS

| CN | 104159741 | 11/2014 |
| WO | WO 2013/126361 | 8/2013 |

(Continued)

OTHER PUBLICATIONS

International Search Report for PCT International Application No. PCT/US2016/066471, dated Apr. 11, 2017, 4 pages.

*Primary Examiner* — Cheng Yuan Huang
(74) *Attorney, Agent, or Firm* — Julie Lapos-Kuchar

(57) ABSTRACT

Described herein is decorative article having a coefficient of friction less than 0.3 wherein the decorative articles comprises: (i) a microsphere layer comprising a plurality of microspheres, wherein the microsphere layer comprises a monolayer of microspheres and wherein the plurality of microspheres are in a microscopic periodic pattern; and (ii) a bead bonding layer disposed on the microsphere layer, wherein the plurality of microspheres are partially embed- (Continued)

ded in the bead bonding layer. Also disclosed herein are transfer articles and methods of making the decorative articles and transfer articles.

19 Claims, 4 Drawing Sheets

(56) References Cited

U.S. PATENT DOCUMENTS

| | | | | |
|---|---|---|---|---|
| 5,207,852 | A * | 5/1993 | Lightle | D04H 3/16 156/230 |
| 5,366,140 | A * | 11/1994 | Koskenmaki | H01L 24/29 228/56.3 |
| 5,474,827 | A * | 12/1995 | Crandall | G02B 5/128 359/536 |
| 5,620,775 | A | 4/1997 | LaPerre | |
| 6,060,157 | A * | 5/2000 | LaPerre | B44C 1/16 428/212 |
| 6,487,002 | B1 | 11/2002 | Biegelsen | |
| 2014/0141195 | A1 * | 5/2014 | Liang | C09J 9/02 428/98 |
| 2014/0255602 | A1 * | 9/2014 | Bates | G02B 1/10 427/163.4 |
| 2015/0010723 | A1 * | 1/2015 | Krishnan | G02B 5/128 428/40.2 |
| 2015/0208511 | A1 * | 7/2015 | Ishimatsu | B32B 37/025 156/229 |
| 2015/0232646 | A1 * | 8/2015 | Walker, Jr. | C09D 7/70 428/206 |
| 2015/0343502 | A1 | 12/2015 | Clark | |
| 2016/0096195 | A1 * | 4/2016 | Barnes | C03C 17/007 428/149 |

FOREIGN PATENT DOCUMENTS

| | | |
|---|---|---|
| WO | WO 2014-190017 | 11/2014 |
| WO | WO 2014-210249 | 12/2014 |
| WO | WO 2015-100220 | 7/2015 |
| WO | WO 2015-123582 | 8/2015 |
| WO | WO 2015-153701 | 10/2015 |
| WO | WO 2016-053734 | 4/2016 |

\* cited by examiner

DECORATIVE ARTICLE FEATURING A MICROSCOPIC PERIODIC PATTERN AND METHODS OF MAKING THE SAME

CROSS REFERENCE TO RELATED APPLICATIONS

This application is a national stage filing under 35 U.S.C. 371 of PCT/US2016/066471, filed Dec. 14, 2016, which claims the benefit of U.S. Application No. 62/269,413, filed Dec. 18, 2015, the disclosure of which is incorporated by reference in its/their entirety herein.

TECHNICAL FIELD

A decorative article comprising a monolayer of microspheres arranged in a microscopic periodic pattern atop a bead bonding layer is described.

SUMMARY

Figure 1:
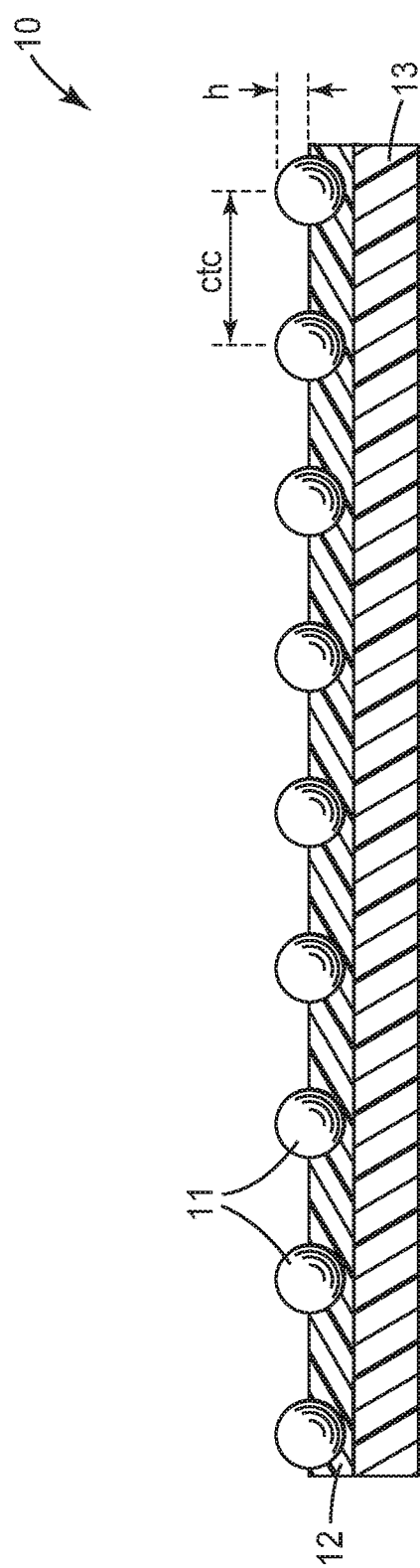
FIG. 1 is a cross-sectional view of a decorative article according to one embodiment of the present disclosure.

There is a need for microsphere coated articles and transfer articles that provide improvements in cutting and/or cost reduction, while achieving the surface durability (i.e., scratch and/or abrasion) and wear resistance provided by conventional microsphere coated articles and transfer articles.

In one aspect, a decorative article is provided comprising: a microsphere layer comprising a plurality of microspheres, wherein the microsphere layer comprises a monolayer of microspheres and wherein the plurality of microspheres are in a microscopic periodic pattern; and a bead bonding layer disposed on the microsphere layer, wherein the plurality of microspheres are partially embedded in the bead bonding layer; and wherein the plurality of microspheres has a ratio of microsphere height to microsphere center-to-center distance greater than 0.1 and less than 0.5, and wherein the decorative article has a coefficient of friction less than 0.3 as measured by the Method for Coefficient of Friction Testing.

In one aspect, a decorative article is provided comprising: a microsphere layer comprising a plurality of microspheres, wherein the microsphere layer comprises a monolayer of microspheres and wherein the plurality of microspheres are in a microscopic periodic pattern; and a bead bonding layer disposed on the microsphere layer, wherein the plurality of microspheres are partially embedded in the bead bonding layer; and wherein the plurality of microspheres covers more than 10% and less than 50% of the surface of the bead bonding layer, and wherein the decorative article has a coefficient of friction less than 0.3 as measured by the Method for Coefficient of Friction Testing.

In another aspect, a transfer article is described comprising: a support layer; a transfer polymer layer bonded to the support layer; and a microsphere layer comprising a plurality of microspheres, wherein the microsphere layer comprises a monolayer of microspheres and wherein the plurality of microspheres are in a microscopic periodic pattern; and wherein the plurality of microspheres are partially embedded in the transfer polymer layer such that more than 50% of the average diameter of the microspheres is exposed and the plurality of microspheres covers more than 10% and less than 50% of the surface of the transfer polymer layer.

In yet another embodiment, a method of making the decorative article is described, the method comprising:

spatially orienting a plurality of microspheres in a layer, such that the plurality of microspheres has a microscopic periodic pattern;

embedding the layer of microspheres in a transfer polymer;

contacting the embedded layer of microspheres with a bead bonding layer; and removing the transfer polymer to form the decorative article In still another embodiment, a method of making the decorative article is described, the method comprising:

depositing a barrier layer material in a predetermined pattern onto a first major surface of a support to form a patterned barrier layer;

contacting a plurality of microspheres onto the patterned barrier layer to form a patterned microsphere layer;

contacting the patterned microsphere layer with a polymeric support, wherein the polymeric support is a bead bonding layer or a transfer polymer layer to make the decorative article.

In still another embodiment, a method of making the decorative article is described, the method comprising:

providing a production tool having a plurality of cavities, wherein the plurality of cavities are in a predetermined pattern;

contacting a plurality of microspheres to the production tool such that the plurality of cavities are filled with the plurality of microspheres to form a layer of patterned microspheres;

transferring the layer of patterned microspheres to a polymeric support, wherein the polymeric support is a bead bonding layer or a transfer polymer layer to make the decorative article.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Decorative protective surfaces find many consumer applications. Household appliances, automotive interiors and paints, consumer electronic devices, such as laptops and hand held devices, are all examples where consumers prefer materials that deliver considerable protection from scratches, wear and abrasion while retaining high cosmetics and aesthetics through the material's lifecycle. Low gloss matte surfaces are of particular interest to many consumers because of their aesthetic appeal.

Durable decorative laminates and films comprised of glass beads are broadly known. These low gloss constructions typically consist of exposed glass bead surfaces that impart high durability and decorative properties to the construction. Typically, the beads are cascade coated or otherwise applied, such that they form a continuous monolayer across the article surface, wherein the beads are packed closely. See U.S. Pat. No. 4,849,265 (Ueda et al.) and U.S. Pat. No. 5,620,775 (LaPerre). Because these constructions comprise hard beads for durability, and the beads are random and closely packed along the construction's surface, cutting the constructions can be difficult.

By reducing the surface coverage of the beads, the constructions may be easier to cut, however, if the beads are randomly applied, the beads can cluster either by random or by electrostatic attractions, leaving areas on the construction's surface void of beads. The present application has identified ordered surfaces that comprise less than full coverage of beads while still providing the surface durability and wear resistance of the underlying surface similar to that provided by conventional, continuous monolayer bead-coated constructions.

Disclosed herein is a construction, which has an exposed surface having a microscopic periodic pattern, wherein the surface has mechanical durability (e.g., abrasion resistant and/or pencil hardness) and the ability to be more easily cut and/or is less expensive than similar constructions that do not have the microscopic periodic pattern. These constructions, in one embodiment, may be applied to surfaces to alter the properties of the surface.

In one embodiment, the decorative articles as disclosed herein have a coefficient of retroreflection of less than or equal to 1.0 candelas/lux/square meter. In some preferred embodiments, the presently disclosed articles have a coefficient of retroreflection of less than or equal to 0.5 candelas/lux/square meter. In some more preferred embodiments, the presently disclosed articles have a coefficient of retroreflection of less than or equal to 0.1 candelas/lux/square meter.

FIG. 1 is an illustration of a cross-section of one embodiment of the decorative article of the present disclosure. Decorative article 10 comprises a microsphere layer which comprises a monolayer of microspheres 11, wherein the plurality of microspheres are partially embedded into bead bonding layer 12. In one embodiment, the decorative article comprises the plurality of microspheres embedded in the bead bonding layer. In another embodiment, the decorative article comprises the plurality of microspheres embedded in the bead bonding layer and the bead bonding layer disposed on a substrate surface. Such as construction is shown in FIG. 1 where bead bonding layer 12 is disposed on substrate 13. The substrate layer may provide additional support to the bead bonding layer and embedded microspheres during processing and handling. Alternatively or additionally, the substrate layer may be the surface the decorative article protects from abrasion, scratches, etc.

Substrate Layer

Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like; and open-cell foams and closed cell foams, including for example, polyurethane foam, polyethylene foam, foamed rubber, and the like. The substrates may, for example, be in the form of a clothing article or footwear; automobile, marine, or other vehicle seat coverings; automobile, marine, or other vehicle bodies; orthopedic devices; electronic devices (including, for example, track pads, and outer surface cover), hand held devices, household appliances; sporting goods; and the like.

In one embodiment, the substrate has a thickness of at least 5, 10, 20, 25, 50 or even 75 micrometers. In one embodiment, the substrate has a thickness of at most 25 mm or even 50 mm Bead Bonding Layer The plurality of microspheres are held in place on top of the substrate via a bead bonding layer. The bead bonding layer is typically an organic polymeric material. It should exhibit good adhesion to the microspheres. It is also possible that an adhesion promoter for the microspheres could be added directly to the bead bonding layer itself as long as it is compatible within the process window for disposing the bead bonding layer on the surfaces of the microspheres.

Materials useful in the bead bonding layer include, but are not limited to those selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, polymer matrix composites, and combinations thereof. In some embodiments, the polymer matrix composites include nanoparticles in resins, fibers in resins, and the like. Combinations can include any combinations of materials, such as interpenetrating networks, dual cure systems, and the like.

The bead bonding layer can be formed, for example, out of solution, aqueous dispersion, or 100% solids coating such as via hot melt, extrusion, or reactive coating. The bead bonding layer may be transparent, translucent, or opaque. It may be colored or colorless. The bead bonding layer may, for example, be clear and colorless or pigmented with opaque, transparent, or translucent dyes and/or pigments. In some embodiments, inclusion of specialty pigments, such as for example metallic flake pigments, can be useful.

In one embodiment, the thickness of the bead bonding layer is at least 50% of the average diameter of the microspheres. Exemplary thicknesses for the bead bonding layer include: thicknesses of at least 10, 25, 50, 100, or even 250 μm (micrometers) or even more (e.g., at least 1 millimeter, at least 1 centimeter, or even 1 meter).

Microsphere Layer

The microsphere layer comprises a plurality of microspheres. The microspheres useful in the present disclosure comprise glass, glass ceramics, ceramics, polymers, metals, and combinations thereof. Glass is an amorphous material, while ceramic refers to a crystalline or partially crystalline material. Glass ceramics have an amorphous phase and one or more crystalline phases. These materials are known in the art.

The microspheres may comprise oxide materials including: silicon dioxide, boron oxide, phosphorous oxide, aluminum oxide, germanium oxide, tin oxide, zinc oxide, bismuth oxide, titanium oxide, zirconium oxide, lanthanide oxides, barium oxide, strontium oxide, combinations thereof; and nonoxide materials including carbide, boride, nitride and silicide, and combinations thereof; and combinations of oxide and nonoxide materials.

Exemplary glass types include: soda lime silicate glass, borosilicate, Z-glass, E-glass, titanate- and aluminate-based glasses, etc. Exemplary glass-ceramic microspheres include those based on lithium disilicate.

In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Miss., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the particles are perfect spheres. Some are oblate, some are melted together and some contain small bubbles.

In one embodiment, the microspheres are plastic particles. The plastic particles selected should comprise a hardness greater than the substrate surface to protect the underlying substrate surface. One exemplary plastic particle includes polyurethane, polystyrene, acrylic and methacrylic acid ester polymers and copolymers (e.g., poly(methyl methacrylate)), and polyurea spheres.

In one embodiment, the microspheres comprise a surface modification as is known in the art to improve the adhesion to the bead bonding layer. Such treatments include those selected from the group consisting of silane coupling agent, titanate, organo-chromium complex, and the like, to maximize the adhesion of the microspheres to the first polymer layer. Preferably, the coupling agent is a silane such as aminosilane, glyoxide silane, or acrylsilane.

The treatment level for such coupling agents is on the order of 50 to 500 parts by weight coupling agent per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the coupling agent with the microsphere, followed by drying in a tumbler or auger-fed dryer to prevent the microspheres from sticking together. One skilled in the art would be able to determine how to best treat the microspheres with the coupling agent.

In one embodiment, the microspheres of the present disclosure have a Knoop hardness of at least 1,300 kgf/mm$^2$, or even 1,800 kgf/mm$^2$. The "Knoop hardness" as used herein is an indentation of microhardness measured by using a Knoop indenter; it is a value obtained by dividing the applied load with which a rhombic indentation is formed on the surface of a sample, by the projected area of the indentation computed from the long diagonal of the permanent indentation. The method for measuring the Knoop hardness is described in ASTM C849-88 (2011) "Standard Test Method for Knoop Indentation Hardness of Ceramic Whitewares".

The microspheres for use in the present invention are substantially spherical, for example, having a sphericity of at least 80%, 85%, or even 90%.

Preferable examples of the spherical particles include fused alumina, alumina produced by the Bayer process, zirconia, titania, and eutectic mixtures thereof.

As a method for shaping inorganic particles into spherical ones, it is possible to apply a method in which the above-described inorganic material in an indeterminate form is ground, and melted in a high-temperature oven at a temperature above the melting point thereof, thereby obtaining spherical particles by utilizing the surface tension; or a method in which the above-described inorganic material is melted at a high temperature above the melting point thereof, and the melt is sprayed to obtain spherical particles.

The microspheres useful in the present disclosure may be transparent, translucent, or opaque. In one embodiment, the microspheres have a refractive index of at least 1.5, 1.6, 1.8, 2.0 or even 2.2. In another embodiment, the microspheres have a refractive index of less than 1.3, 1.4, 1.5, or even 1.55. The refractive index may be determined by the standard Becke line method.

The microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

In some embodiments, a useful range of average microsphere diameters is at least 10, 20, 25, 40, 50, 75, 100, or even 150 μm (micrometers); at most 200, 400, 500, 600, 800, 900, or even 1000 μm. The microspheres may have a unimodal or multi-modal (e.g., a bimodal) size distribution depending on the application.

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. Shown below is table of exemplary sieves.

TABLE 1

| U.S. Sieve Designation No. | Nominal Opening (microns) |
|---|---|
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |

TABLE 1-continued

| U.S. Sieve Designation No. | Nominal Opening (microns) |
|---|---|
| 400 | 38 |
| 500 | 25 |
| 635 | 20 |

Alternately, average diameter can be determined using any commonly known microscopic methods for sizing particles. For example, optical microscopy or scanning electron microscopy, and the like, can be used in combination with any image analysis software. For example, software commercially available as free ware under the trade designation "IMAGE J" from NIH, Bethesda, Md.

In one embodiment, the plurality of microspheres have a difference in size distribution not more than 40% (30% or even 20%) based on the average microsphere diameter.

Decorative Article

The decorative articles of the present disclosure, comprise a plurality of microspheres, which are arranged in a monolayer (i.e., a single layer) on the surface of the bead bonding layer in a microscopic periodic pattern, meaning that the microspheres are arranged in a pattern on the microscopic level (i.e., a pattern in relation to the other microspheres) and the pattern is periodic (i.e., not random and having an order to it). The unit repeat, i.e., the area consuming the repeat pattern may have a triangular, quadrilateral (e.g., square, rhombus, rectangle, parallelogram), hexagonal, or other repeat pattern shape, which may be symmetric or asymmetric in nature.

Figure 2:
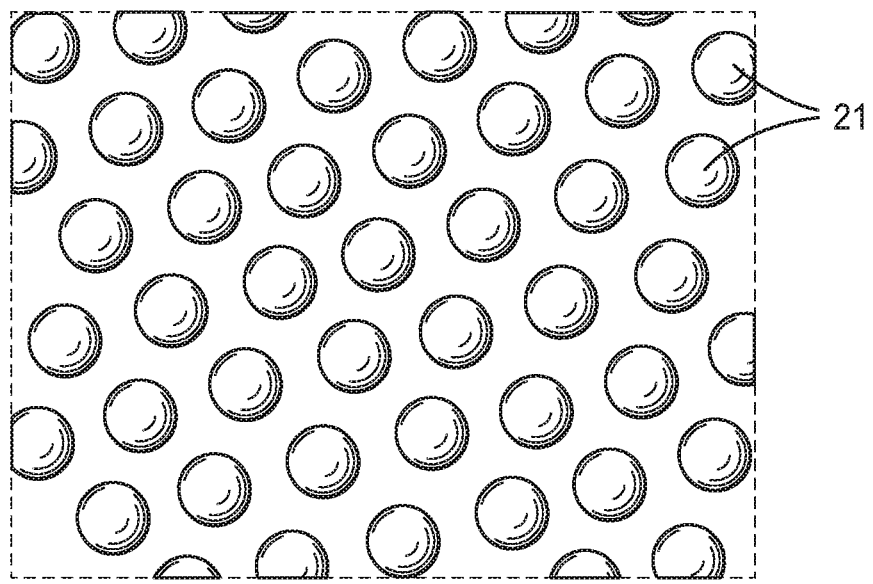
FIG. 2 is a schematic representation of the top view of the decorative article made according the EX1A.

Shown in FIG. 2 is a top view of decorative article 20 of the present disclosure, wherein the plurality of microspheres 22 are arranged in a microscopic periodic pattern across the top of the article. The microspheres in FIG. 2 are arranged in a triangular pattern.

Figure 3A:
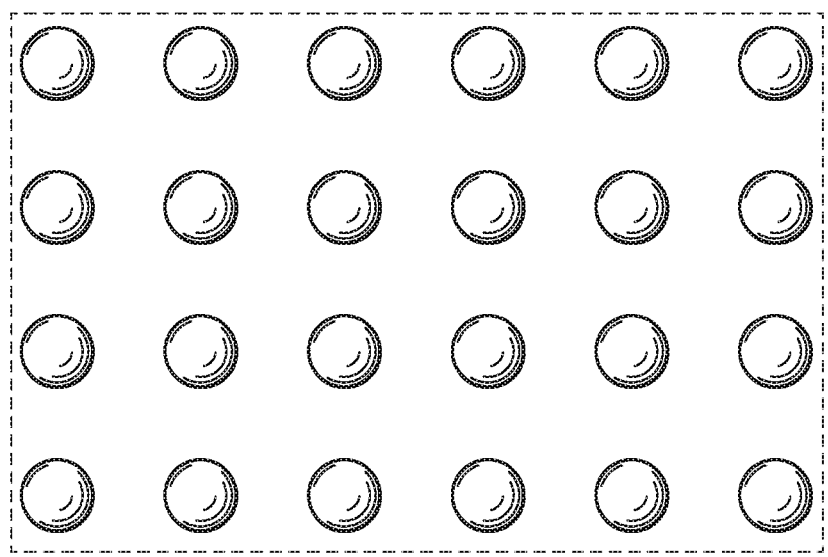
FIGS. 3A and 3B are exemplary microscopic periodic patterns.
Figure 3B:
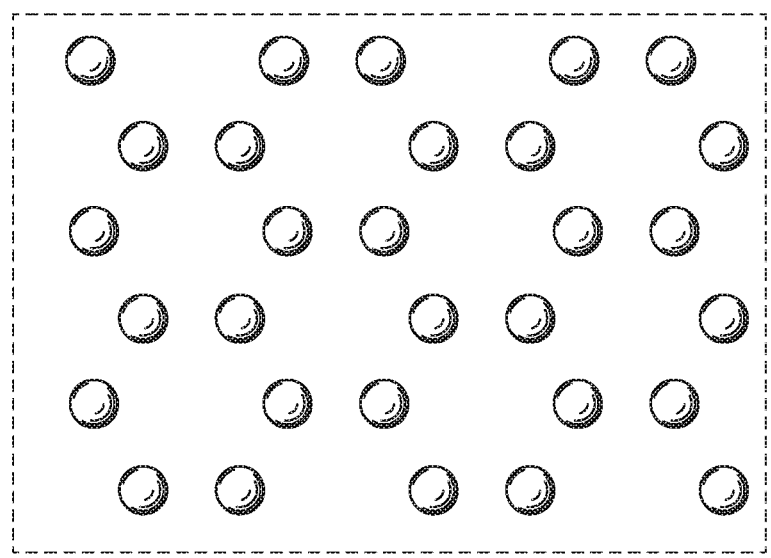

Shown in FIGS. 3A and 3B are top views of a construction wherein the plurality of microspheres are arranged in a square (FIG. 3A) and hexagonal (FIG. 3B) pattern.

Figure 4:
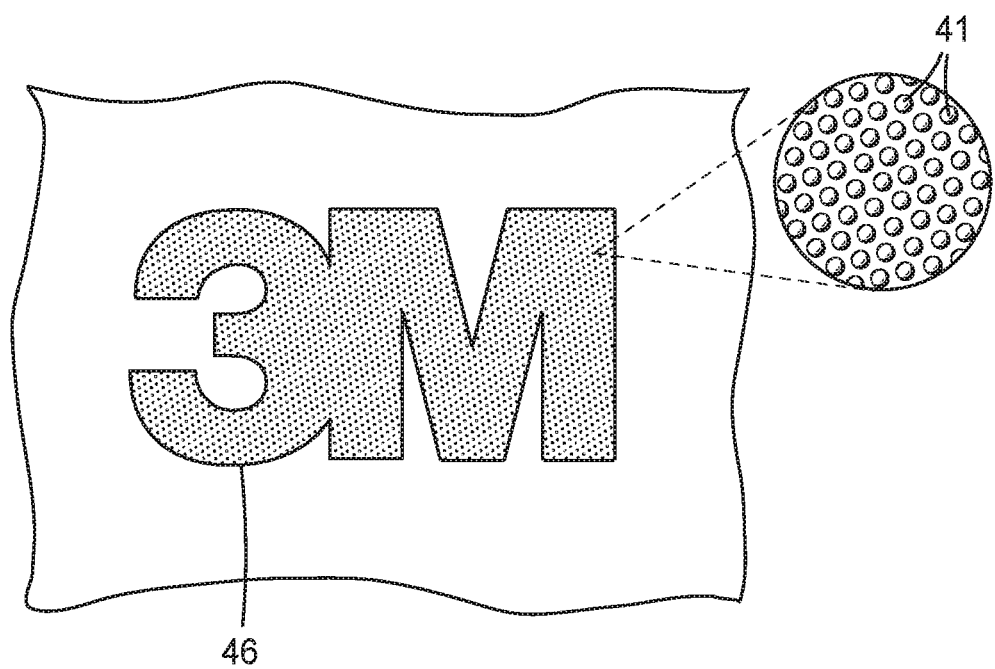
FIG. 4 is a top view of a decorative article comprising a macroscopic pattern made from a microscopic periodic pattern of microspheres.

In addition to the microscopic patterning, the microspheres in the layer may comprise a macroscopic pattern. The microscopic patterning is on the order of the diameter of the microspheres and the macroscopic pattern is a pattern much larger than the diameter of the microspheres, for example, 50, or even 100 times larger than the average diameter of the microspheres. See for example FIG. 4, where image 46 is a macroscopic pattern made with the microscopic patterning of a plurality of microspheres 41.

In the decorative articles of the present disclosure, the plurality of microspheres are partially embedded into the bead bonding layer, which means that the microspheres are located approximately at least 50%, 60%, 70% or even 80% of the microsphere diameter into the bead bonding layer, however, a portion of each of the microspheres projects outwardly from the surface of the bead bonding layer to provide among other things, durability, abrasion resistance, and/or a low coefficient of friction. Shown in FIG. 1 is "h", which is the vertical height from the surface of the bead bonding layer to the apex of the microsphere and "ctc" which is the distance from the apex of one microsphere to the apex of an adjacent microsphere. By averaging the "h" and "ctc" for the decorative article, a ratio of microsphere height to microsphere center-to-center distance can be determined. In one embodiment, the plurality of microspheres have a ratio of microsphere height to microsphere center-to-center distance is greater than 0.1, 0.15, 0.2, or even 0.25; and at most 0.3, 0.4, or even 0.5.

In the present disclosure, the plurality of microspheres cover more than 10, 15, 20, or even 25%; and less than 30, 40, 45, or even 50% of the surface of the bead bonding layer.

In one embodiment, the microspheres do not touch their neighbor. In fact, in one embodiment, the distance between nearest neighbors between two microspheres in the plurality of microspheres is at least ⅛, ¼, ½, ¾, 1 or even 1.5 times the average diameter of the microspheres; and at most 3, 3.5, 4, 4.5, or even 5 times the average diameter of the microspheres.

The decorative article of the present disclosure are durable, meaning that they have abrasion and/or scratch resistance. Abrasion resistance, can be measured using a rotary Taber abraser and visually inspecting the samples for damage. In one embodiment, the decorative articles of the present disclosure have an abrasion resistance of no more than 10, 5, or even 3.5. The scratch resistance can be measured by pencil hardness. In other words, at which hardness the pencil scratches the surface. In one embodiment, the decorative articles of the present disclosure have a pencil hardness value of at least 3H, 6H, 8H, or even 10H at a force of 2.5 Newtons.

The decorative article of the present disclosure have a coefficient of friction of less than 0.3 or even 0.2. The coefficient of friction can be measured by the Method for Coefficient of Friction Testing disclosed herein.

Other Layers

In addition to the substrate, bead bonding layer, and microsphere layer previously mentioned, the decorative article of the present disclosure may also comprise additional layers to impart desirable characteristics into the decorative article. For example, the decorative article may be made stain resistant, by using a bead bonding layer comprising a fluorine-containing polymer, such as those derived from tetrafluoroethylene, hexaflouropropylene, vinylidene fluoride, etc., as taught in WO Publ. No. 2014/210249 (Walker et al.), incorporated herein by reference. A nanoparticle-containing undercoat may be applied between the microsphere layer and the bead bonding layer to provide anti-soiling properties as taught in U.S. Pat. Publ. No. 2015-0343502 (Clark et al.), incorporated herein by reference. In one embodiment, an stain resistant layer is disposed between the bead bonding layer and the microsphere layer, wherein the stain resistant layer comprises a resin selected from at least one of the following thermoplastic and thermoset (i.e., crosslinked) materials: polyurethanes, polyureas, polyurethane ureas, polypolyesters, polycarbonate, acrylonitrile butadiene styrene, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.

Patterning the Plurality of Microspheres

In one embodiment, the plurality of microspheres may be patterned using a patterned planar form such as a mesh or perforated film, wherein a microsphere is held within each of the openings or cavities of the patterned form. In one embodiment, the patterned form is placed against a support and the plurality of microspheres is flooded or cascaded onto the patterned form, optionally using an excess amount of microspheres to ensure that all openings or cavities are filled. An assisting member, such as a doctor blade, felt wiper, brush having a plurality of bristles, a vibration systems, a blower or air knife, vacuum, or combinations thereof, may optionally be used to move, suck or agitate the microspheres into each of the openings or cavities.

In another embodiment, the patterned form is a roller, wherein the outer surface of the roller comprises a pattern of cavities corresponding to the diameter of the microspheres. A patterned roller is conducive to web processing, wherein the plurality of microspheres floods the patterned roller. An assisting member, as described above, may be used to ensure filling of the cavities in the patterned roller.

In yet another embodiment, a patterned barrier material is applied to a support. The barrier material is any suitable material that substantially prevents microspheres from attaching to the support on which the barrier material is applied. Exemplary barrier materials include: waxes, resins, polymeric materials, inks, inorganics, UV-curable polymers, and particles composed of either organic or inorganic metallic or non-metallic materials. The barrier material is applied in a predetermined pattern onto a support. The barrier layer may be deposited by any suitable method. Printing is typically the most preferred method, including contact printing, e.g. flexographic printing, gravure printing, ink jet printing, and screen printing. However, any discontinuous deposition method (e.g. needle die coating of stripes) can be used. The plurality of microspheres can be added to patterned barrier material. The microspheres will be repelled by the patterned barrier material and thus form a monolayer of patterned microspheres. Such a technique is disclosed in WO Appl. No. US2015/051864 filed 24 Sep. 2015, herein incorporated by reference.

The patterned microspheres may then be contacted with a bead bonding layer or a temporary support, such as an adhesive or a transfer polymer layer, which temporarily retains the plurality of microspheres in its microscopic pattern until they can be transferred to a bead bonding layer.

In one embodiment, the patterned microspheres are contacted directly with a bead bonding layer. For example, a plurality of microspheres is contacted with a patterned roller comprising a plurality of cavities. The microspheres fill the cavities and are then transferred to a web comprising a bead bonding layer. The bead bonding layer is in proximity (e.g., close proximity or contacting) the microsphere-filled patterned roller, and the microspheres are transferred to the bead bonding layer. To facilitate embedding of the microspheres into the bead bonding layer, (1) the bead bonding layer may be heated, (2) pressure may be applied between the patterned roller and the web (e.g., via a nip configuration) or (3) heating and applying pressure to the plurality of microspheres on the bead bonding layer. Such a web process is described in WO Publ. No. 2015/100220 (Culler et al.) incorporated by reference herein.

In one embodiment, the decorative articles disclosed herein may be made via a transfer process wherein the layer of microspheres is patterned and held in a transfer resin which is then used to transfer the layer of patterned microspheres onto the bead bonding layer.

The transfer article of the present disclosure comprises a monolayer of patterned microspheres which are attached, in some embodiments partially embedded, in a transfer resin.

Figure 5:
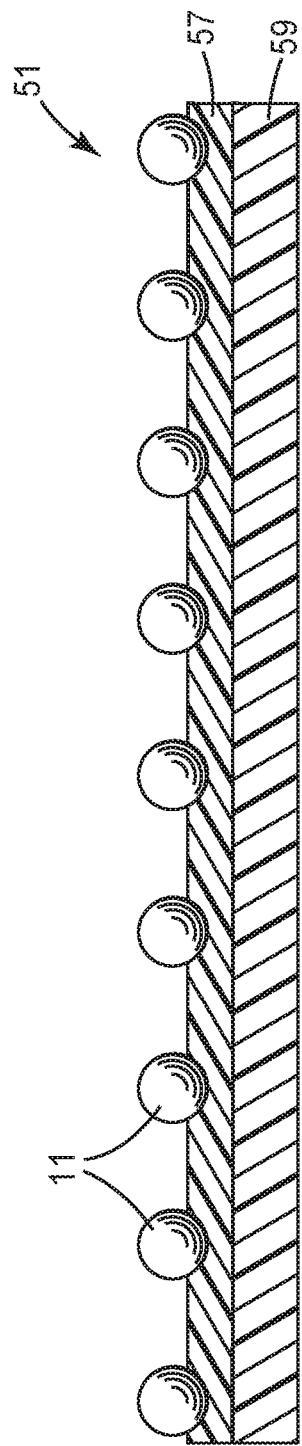
FIG. 5 is a cross-sectional view of a transfer article according to one embodiment of the present disclosure.

In one embodiment, the constructions of the present disclosure are made via a transfer method, which may be understood by reference to FIG. 5, which shows transfer article, which in its simplest form, comprises support layer 59, transfer polymer layer 57 bonded thereto, and a plurality of patterned microspheres 51. Transfer polymer layer 57 temporarily partially embeds the plurality of microspheres. A bead bonding layer is constructed upon the partially embedded microspheres optionally along with the substrate layer. This construction may be accomplished by forming the first bead bonding layer atop the transfer article and then adding the substrate; or the decorative article may be made by contacting the transfer article to a construction comprising the substrate and the bead bonding layer and pressing the two together such that the plurality of microspheres is embedded into the bead bonding layer. The transfer polymer layer 57 has low adhesion to the plurality of microspheres as compared to the bead bonding layer in which the plurality of microspheres are also embedded in, so that the support layer and transfer polymer layer can be removed to expose the surface of the plurality of microspheres, generating the decorative articles of the present disclosure. Such transfer techniques are known in the art.

The transfer article comprises a support layer and a transfer polymer layer. As will be described below, the microspheres are first embedded into the transfer polymer layer of the transfer article. Because the transfer polymer layer generally has a tacky nature, the transfer polymer layer is typically contacted onto a support layer to provide physical support.

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful film for the transfer article of the present disclosure. If the support layer is a thermoplastic film it should preferably have a melting point above that of the polymer used in the bead bonding layer. Useful temporary support layers for forming the carrier include, but are not limited to those selected from the group consisting of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like.

Useful materials for forming the transfer polymer layer include, but are not limited to, thermoplastics such as those selected from the group consisting of polyolefins such as polyethylene, polypropylene, organic waxes, blends thereof, and the like.

The thickness of the transfer polymer layer is chosen according to the microsphere diameter distribution. According to the present disclosure, the microsphere embedment becomes approximately the mirror image of the transfer article embedment. For example, a microsphere which is embedded to about 30% of its diameter in the transfer polymer layer is typically embedded to about 70% of its diameter in the bead bonding layer.

In order to partially embed the microspheres in the transfer polymer layer, the transfer polymer layer should preferably be in a tacky state (either inherently tacky and/or by heating). The microspheres may be partially embedded, for example, by applying a layer of microspheres on the transfer polymer layer followed by one of (1)-(3):(1) heating the transfer article, (2) applying pressure to the plurality of microspheres on the transfer article (with, for example, a roller) or (3) heating and applying pressure to the plurality of microspheres on the transfer article.

For a given transfer polymer layer, the microsphere embedment process is controlled primarily by temperature, time of heating and thickness of the transfer polymer layer. The interface of the transfer polymer layer with the temporary support layer becomes an embedment bonding surface since the microspheres will sink until they are stopped by the dimensionally stable temporary support layer.

The thickness of the transfer polymer layer should be chosen to prevent encapsulation of most of the smaller diameter microspheres so that they will not be pulled away from the first polymer layer when the second polymer layer is removed. On the other hand, the transfer polymer layer must be thick enough so that the larger microspheres in the microsphere layer are sufficiently embedded to prevent their loss during subsequent processing operations.

The transfer article can be described using similar properties as discussed above for the decorative article. In one embodiment, the transfer article of the present disclosure, has a ratio of microsphere height (h, defined as the vertical distance from the microsphere apex to the transfer polymer surface) to microsphere center-to-center distance (ctc) greater than 0.1, 0.15, 0.2, or even 0.25; and at most 0.4, 0.5, 0.8, or even 1. In one embodiment, the plurality of microspheres cover more than 10, 15, 20, or even 25%; and less than 30, 40, 45, or even 50% of the surface of the transfer polymer layer.

As described above, decorative articles, transfer articles and methods of making them have been disclosed herein. Compared to articles comprising a continuous monolayer of microspheres, the articles of the present disclosure have an ordered, discontinuous monolayer of microspheres as shown in FIG. 2. Less surface coverage of the plurality of microspheres can allow for cost reductions (e.g., less microspheres used per article, and/or article weighs less). The microscopic periodic pattern of microspheres allows for the entire microsphere coated surface of the decorative article to have durability due to the protection afforded by the microspheres. Ideally, the microscopic periodic pattern of microspheres has a minimal amount of defects (e.g., missing microspheres, broken microspheres). The ordered patterning of the plurality of microspheres can enable benefits such as ease of cutting the article (see, e.g., the straight line comprising no microspheres in FIGS. 2 and 3) and/or the loss of microspheres along the cut line, keeping the abrasion resistance and/or hardness of the article maintained up to the cut line.

Exemplary embodiments of the present disclosure include, but are not limited to

Embodiment 1. A decorative article comprising:
a microsphere layer comprising a plurality of microspheres, wherein the microsphere layer comprises a monolayer of microspheres and wherein the plurality of microspheres are in a microscopic periodic pattern; and
a bead bonding layer disposed on the microsphere layer, wherein the plurality of microspheres are partially embedded in the bead bonding layer; and wherein the plurality of microspheres has a ratio of microsphere height to microsphere center-to-center distance greater than 0.1 and less than 0.5, and wherein the decorative article has a coefficient of friction less than 0.3 as measured by the Method for Coefficient of Friction Testing.

Embodiment 2. The decorative article of embodiment 1, wherein the plurality of microspheres covers more than 10% and less than 50% of the surface of the bead bonding layer, Embodiment 3. A decorative article comprising:
a microsphere layer comprising a plurality of microspheres, wherein the microsphere layer comprises a monolayer of microspheres and wherein the plurality of microspheres are in a microscopic periodic pattern; and
a bead bonding layer disposed on the microsphere layer, wherein the plurality of microspheres are partially embedded in the bead bonding layer; and wherein the plurality of microspheres covers more than 10% and less than 50% of the surface of the bead bonding layer, and wherein the decorative article has a coefficient of friction less than 0.3 as measured by the Method for Coefficient of Friction Testing.

Embodiment 4. The decorative article of embodiment 3, wherein the plurality of microspheres has a ratio of microsphere height to microsphere center-to-center distance greater than 0.1 and less than 0.5

Embodiment 5. The decorative article of any one of the previous embodiments, wherein the plurality of microspheres covers more than 20% and less than 30% of the surface of the bead bonding layer.

Embodiment 6. The decorative article of any one of the previous embodiments, further comprising a substrate, wherein the bead bonding layer is disposed between the substrate and the microsphere layer.

Embodiment 7. The decorative article of embodiment 6, wherein the substrate comprises at least one of a metal, fabric, polymer, paper, and combinations thereof.

Embodiment 8. The decorative article of any one of the previous embodiments, wherein the decorative article has a pencil hardness of at least 3H.

Embodiment 9. The decorative article of any one of the previous embodiments, wherein the distance between nearest neighbors in plurality of microspheres is ⅛ to 5 times the average diameter of the microspheres.

Embodiment 10. The decorative article of any one of the previous embodiments, wherein the plurality of microspheres have an average diameter of 20 to 200 micrometers.

Embodiment 11. The decorative article of any one of the previous embodiments, wherein the microscopic periodic pattern comprises a repeat unit selected from: triangular, quadrilateral, pentagonal, hexagonal, and combinations thereof.

Embodiment 12. The decorative article of any one of the previous embodiments, wherein the microspheres in the plurality of microspheres are translucent or opaque.

Embodiment 13. The decorative article of any one of the previous embodiments, wherein the microspheres in the plurality of microspheres comprise at least one of a glass, ceramic, glass ceramic, metal, plastic, and combinations thereof.

Embodiment 14. The decorative article of any one of the previous embodiments, wherein the microspheres in the plurality of microspheres have a Knoop hardness of 1300 kgf/mm$^2$.

Embodiment 15. The decorative article of any one of the previous embodiments, wherein the microspheres in the plurality of microspheres have an index of refraction of less than 1.55.

Embodiment 16. The decorative article of any one of the previous embodiments, wherein the microspheres in the plurality of microspheres have a sphericity of at least 80%.

Embodiment 17. The decorative article of any one of the previous embodiments, wherein the microspheres in the plurality of microspheres have a size difference of no more than 40%.

Embodiment 18. The decorative article of any one of the previous embodiments, wherein the bead bonding layer comprises at least one of: a polyurethane, polyesters, (meth)acrylic acid ester polymers, an epoxy, a (meth)acrylate, polyvinylchloride polymer, polyvinyl acetate polymer, polyamides, a urethane/(meth)acrylate, a silicone, polyolefin, fluoropolymers, acrylobutadiene polymers, and blends thereof.

Embodiment 19. The decorative article of any one of the previous embodiments, wherein the monolayer of microspheres further comprises a macroscopic pattern.

Embodiment 20. The decorative article of any one of the previous embodiments, comprising a crosslinked polymer, a fluoropolymer, and combinations thereof.

Embodiment 21. A transfer article comprising:
a support layer;
a transfer polymer layer bonded to the support layer; and
a microsphere layer comprising a plurality of microspheres, wherein the microsphere layer comprises a monolayer of microspheres and wherein the plurality of microspheres are in a microscopic periodic pattern; and wherein the plurality of microspheres are partially embedded in the transfer polymer layer such that more than 50% of the average diameter of the microspheres is exposed and the plurality of microspheres covers more than 10% and less than 50% of the surface of the transfer polymer layer.

Embodiment 22. A transfer article comprising:
a support layer;
a transfer polymer layer bonded to the support layer; and
a microsphere layer comprising a plurality of microspheres, wherein the microsphere layer comprises a monolayer of microspheres and wherein the plurality of microspheres are in a microscopic periodic pattern; and wherein the plurality of microspheres are partially embedded in the transfer polymer layer such that more than 50% of the average diameter of the microspheres is exposed and wherein the plurality of microspheres has a ratio of microsphere height to microsphere center-to-center distance greater than 0.1 and less than 0.5.

Embodiment 23. The method of any one of embodiments 21-22, wherein the transfer polymer layer comprises at least one of a polyolefin, organic wax, and combinations thereof.

Embodiment 24. A method of making a decorative article, the method comprising:
spatially orienting a plurality of microspheres in a layer, such that the plurality of microspheres has a microscopic periodic pattern;
embedding the layer of microspheres in a transfer polymer;
contacting the embedded layer of microspheres with a bead bonding layer; and
removing the transfer polymer to form the decorative article of any one of embodiments 1-20.

Embodiment 25. The method of embodiment 24, wherein the plurality of microspheres are spatially oriented using a mesh comprising a plurality of openings to hold a microsphere and a vacuum to pull the plurality of microspheres to the mesh.

Embodiment 26. A method of making the decorative article of any one of embodiments 1-20, comprising:
depositing a barrier layer material in a predetermined pattern onto a first major surface of a support to form a patterned barrier layer;
contacting a plurality of microspheres onto the patterned barrier layer to form a patterned microsphere layer;
contacting the patterned microsphere layer with a transfer polymer and removing the support to form an embedded layer of microspheres comprising a plurality of microspheres partially embedded in the transfer polymer with the apexes of the microspheres exposed;
contacting the exposed apex side of the embedded layer of microspheres with a bead bonding layer; and
separating the bead bonding layer from the transfer polymer to form the decorative article of any one of embodiments 1-20.

Embodiment 27. A method of making the decorative article of any one of embodiments 1-20, comprising:
depositing a barrier layer material in a predetermined pattern onto a first major surface of a support to form a patterned barrier layer;
contacting a plurality of microspheres onto the patterned barrier layer to form a patterned microsphere layer;
contacting the patterned microsphere layer with a bead bonding layer; and
removing the support to make the decorative article of any one of embodiments 1-20.

Embodiment 28. A method of making the decorative article of any one of embodiments 1-20, comprising:
providing a production tool having a plurality of cavities, wherein the plurality of cavities are in a predetermined pattern;
contacting a plurality of microspheres to the production tool such that the plurality of cavities are filled with the plurality of microspheres to form a layer of patterned microspheres;
transferring the layer of patterned microspheres to a transfer polymer to form an embedded layer of microspheres comprising a plurality of microspheres partially embedded in the transfer polymer with the apexes of the microspheres exposed;
contacting the exposed apex side of the embedded layer of microspheres with a bead bonding layer; and
separating the bead bonding layer from the transfer polymer to form the decorative article of any one of embodiments 1-20.

Embodiment 29. A method of making the decorative article of any one of embodiments 1-20, comprising:
providing a production tool having a plurality of cavities, wherein the plurality of cavities are in a predetermined pattern;
contacting a plurality of microspheres to the production tool such that the plurality of cavities are filled with the plurality of microspheres to form a layer of patterned microspheres;
transferring the layer of patterned microspheres to a bead bonding layer to form an embedded layer of microspheres comprising a plurality of microspheres partially embedded in the bead bonding layer to make the decorative article of any one of embodiments 1-20.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

| Designation | Description |
|---|---|
| K-FLEX 188 | 100% active polyester polyol obtained from King Industries, Inc., Norwalk, CT under trade designation "K-FLEX 188" |

-continued

| Designation | Description |
|---|---|
| DESMODUR N3300A | Solvent-free polyfunctional aliphatic isocyanate resin based on hexamethylenediisocyanate, obtained from Bayer Materials Science, Pittsburgh, PA under trade designation "DESMODUR N3300A" |
| T12 | Catalyst, dibutyltin dilaurate (DBTDL), a liquid catalyst, Air Products and Chemicals, Inc., Allentown, PA under trade designation "DABCO T-12" |
| RDL Beads | Non-vitreous, solid, transparent ceramic microspheres made according to the teachings of U.S. Pat. No. 4,564,556 |
| ZGC Beads | Ceramic microspheres, obtained from 3M Company, Saint Paul, MN under trade designation "3M MICRO MILLING MEDIA ZGC-75" and "3M MICRO MILLING MEDIA ZGC-100", respectively |
| Polyethylene Transfer Liner | A 1 mil (25 micrometer), 2 mil (50 micrometer), or 4 mil (100 micrometer) polyethylene film extrusion coated onto 3.8 mil (96.5 micrometer) polyethylene teraphtalate (PET) |
| 3M Tape 1280 | Low stretch polyester tape, obtained from 3M Company, Saint Paul, MN under trade designation "3M CIRCUIT PLATING TAPE 1280" |
| n-Heptane | Obtained from Aldrich Chemical Company, Milwaukee, WI |
| SPG Print Screens | Obtained from SPG Prints America Inc., Charlotte, NC |

Test Methods

Method for Determining Pencil Hardness

Samples were prepared according to the Examples and Comparative Examples described below were evaluated for pencil hardness according to ASTM D 3363-00 "Standard Test Method for Film Hardness by Pencil Test". Abrasive sandpaper (Grit No. 400) was adhered to a flat and smooth benchtop with double coated tape. Pencil leads (Totiens Drawing Leads with mechanical lead holder) were held at an angle of 90° to the abrasive paper and abraded until a flat, smooth, circular cross-section free of chips or nicks on the edge of the lead was achieved. The force on the tip of the pencil was fixed at 2.5 N. The sample was placed on a glass surface. Using a freshly prepared pencil lead for each test, the lead was pressed firmly against the sample at a 45° angle and at the desired load (2.5 N) using an Elcometer 3086 Motorized Pencil Hardness Tester (obtained from Elcometer Incorporated, Rochester Hills, Mich.) and drawn across the test panel in the "forward" direction for a distance of at least ¼ inch (6.4 mm). Three pencil tracks were made for each grade of lead hardness. Prior to inspection, crumbled lead was removed from the test area using a damp paper towel wetted with isopropyl alcohol. The sample was inspected by eye for defects for the first ⅛ (3.2 mm) to ¼ inch (6.4 mm) of each pencil track. Moving from harder leads to softer, the process was repeated down the hardness scale until a pencil was found that did not scratch the sample or rupture it, or dislodge or partially dislodge any microspheres. At least two of three tracks at each lead hardness were required to meet these criteria in order to pass. The hardest level of lead that passed was reported as the pencil hardness for the sample.

Method for Taber Abrasion Test

Abrasion testing was carried out using a linear Tabor Abrasion Tester (obtained from Taber Industries, North Tonawanda, N.Y.). The samples prepared according to the Examples and Comparative Examples described below were fixed to the testing surface and abraded with a CS-10 weareser with 408 grams weight, 500 cycles at 25 cycles/minute. Samples were evaluated for microsphere damage, microsphere displacement and damage between microspheres. Also, the samples were rated (from 1-5, with 5 being the most damage) for the level of damage attained by the sample during Taber abrasion testing.

Method for Profilometry Measurements

Microsphere height, average microsphere height, microsphere diameter at the surface of samples prepared according to the Examples and Comparative Examples described below were determined from profilometry using a Bruker Dektak XT profiler (obtained from Bruker Corp., Billerica, Mass.). Measurement setup, instrument operation, and data analysis were performed using Bruker Vision64 software (obtained from Bruker Corp., Billerica, Mass.). The parameters used for surface measurements of the samples were as follows:

Scan Type: Map Scan; Range: 524 µm; Profile: Hills and Valleys; Stylus Type: 2 µm;

Style Force: 5 mg; Length: 1000 µm; Duration: 10 sec; Resolution: 0.333 µm/pt;

Sample: 3001 pts; Speed: 100 µm/s; Map Extent: 200 µm; Map resolution: 5 µm/trace;

Number of traces: 40; Additional Parameters: Soft touchdown and safe mode.

Samples prepared according to the Examples and Comparative Examples described below were prepared by applying a section of gloss finish transparent tape to the sample surface to be used as the landing spot and starting point for each trace. The flat surface created by the gloss tape allowed for more accurate stitching of traces to produce a 3D map of the sample surface.

The data analyzer recipe contained Mask Data and Remove Tilt filters and Z stats to obtain the Rpm (average peak height) calculation. The measured microsphere height and diameter at the sample surface was determined by averaging the x and y coordinates from 3 individual traces to determine the height of the sample floor, the maximum height of the microsphere, and the diameter of the microsphere at the sample surface.

Method for Coefficient of Friction Testing

Samples prepared according to the Examples and Comparative Examples described below were evaluated for coefficient of friction using a table top peel tester (Model 3M90, available from Instrumentors Inc., Strongsville, Ohio). A 3.2 mm (0.013 inch) thick elastomeric foam having a density of about 0.25 g/cc (cubic centimeters) was bonded to a flat steel substrate measuring 63.5 mm (2.5 inches) square, having a thickness of about 6 mm (0.024 inches), and weighing approximately 200 grams including the foam. Next, a sample having a length of 63.5 mm (2.5 inches) that was approximately 5 mm longer than the steel substrate was place over the foam covered surface of the steel substrate such that the sample was wrapped around the leading edge of the steel substrate. A hole was cut in the sample to accommodate the pin by which the steel substrate was pulled during testing. This test article was placed with the sample side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds, wherein the surface comprising the plurality of microspheres (if present) contacted the glass surface. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of ten readings/second and the average was recorded. Three trials were run for each sample and the average was reported for the coefficient of friction.

Method for Retro-Reflectivity Test

Measurements of the coefficient of retro-reflection (Ra) were made directly on the surface comprising the plurality of microspheres of various constructions prepared according to the Examples and Comparative Examples described below. Procedure B of 10 ASTM Standard E 809-94a (2000) "Standard Practice for Measuring Photometric Characteristics of Retroreflectors" was followed. The samples were measured at an entrance angle of −4.0 degrees and an observation angle of 1 degree. The photometer used for those measurements was Model Retro-Meter 2 available from Advanced Retrotechnology Inc., Baltimore, Md. Ra was reported in Candelas/square meter/lux.

Method for Microscopy Test

Microscopic distance measurements were conducted using a Nikon Optophot 66 microscope (obtained from Nikon Corp., Tokyo, Japan) with a Paxcam II digital camera (obtained from PAXCam, VillaPark, Ill.) connected to a personal computer. The Paxcam II software was calibrated with a microscopic scale allowing the determination of microsphere size and distance between microspheres using transmitted light through the samples. Software allowed precise measurements of microsphere size and calculation of the coverage of microspheres on the surface. This calculation was based upon exposed particle area from profilometer data and distance between microspheres from microscope measurements. For the patterned microsphere samples, the percent coverage of the surface is equal to the ratio of the exposed area projection of 3 microspheres to the area of the hexagonal unit cell. For the random (or unpatterned) samples, the percent coverage was measured by using ImageJ image analysis software, available at ImageJ.net website, which counts particles, measures sizes and the total coverage of the surface. The measurements were corrected by the exposed area projection of the microspheres.

Method for Preparing Microsphere-Coated Articles

Patterning of the Microsphere Monolayer

Microspheres to be coated were sieved using screen sieves to produce a relatively narrow size distribution. The sieves were obtained from Tyler Inc., Mentor, Ohio. ZGC 100 beads were sieved to between 90 and 106 micrometers, ZGC 75 beads were sieved to between 75 and 90 micrometers and RDL beads were sieved to between 160 and 190 microns. Then, round beads were separated from irregular beads with flat spots or broken beads using a Roundometer (obtained from Future Labs LLC, Madison Miss.) with a plate at a 3 degree angle. Round beads were used for coating while the irregular beads were discarded.

SPG Print Screens were used as positioning (i.e., patterning) screens. Five different screens were used varying in hole sizes and hole center to center (CTC) distance as follows:

| Screen # | Hole Size (micrometers) | Hole center to center distance (micrometers) |
| --- | --- | --- |
| 0 | 67 | 154 |
| 1 | 67 | 123 |
| 2 | 101 | 320 |
| 3 | 53 | 130 |
| 4 | 120 | 428 |

The patterning screens were placed upon a supporting ⅛ inch (3.2 mm) media grade 5, porous stainless steel (obtained from Mott Corporation, Farmington, Conn.) pieces cut to small 3 inch by 5 inch (7.6 cm×12.7 cm) pieces for the Examples and Comparative Examples described below. The support plate and patterning screen were fitted over a funnel connected to a vacuum source to create a pull on the microspheres as they sat on top of the holes in the screens. The vacuum was generated using a 2-HP Craftsman vacuum (obtained from a Sears department store). Microspheres were placed on the patterning screens by brushing a small pile of microspheres over the screen surface with a small paint brush while applying the vacuum to the assembly.

After the microspheres were placed on the patterning screen as described above, 3M Tape 1280 was placed on the patterning screen, contacting the microspheres. After applying a roller over the microspheres, the vacuum air flow was stopped and the tape was peeled off the patterning screen. Essentially all of the microspheres were transferred from the patterning screen to the tape in a regular pattern as determined by the patterning screen.

Preparation of Patterned Microsphere Monolayer Transfer Article

The monolayer of microspheres on the 3M Tape 1280 (from above) was pressed against a polyethylene transfer liner film (selected from 1 mil (25 micrometer), 2 mil (50 micrometer), or 4 mil (100 micrometer) thick polyethylene on 3.8 mil (96.5 micrometer) polyester film), with the application of moderate heat at 130° C. for a short time partially imbedding the microspheres into the polyethylene. After allowing the sandwich assembly for several minutes to allow at least partial crystallization of polyethylene around the microspheres, the tape was removed by applying n-heptane to the interface between the tape and the microspheres. The heptane dissolved the tape adhesive and resulted in a clean transfer of the microspheres to the polyethylene liner film. The microsphere-coated polyethylene sheet was further rinsed with heptane and allowed to dry. The microsphere-coated sheet was then heated in an oven at 135 C for various times in order to "sink" the microspheres in the polyethylene layer. The sinking was accomplished either at 2 minutes in the oven for some of the microspheres or 6 minutes for some of the larger microspheres to form a transfer article.

Preparation of Random Microsphere Monolayer Transfer Article 25 grams of microspheres were placed in a metal box with a lid. On the lid was taped the polyethylene transfer liner 6 inch by 8 inch (15 cm×20.3 cm) in size. The box and the liner were heated to 105° C. for 0.5 hours in an oven. The box was turned upside down to deliver the warm microspheres to the surface of the polyethylene liner while the box was tilted back to front, side to side, and corner to corner, so as to uniformly cascade the mass of microspheres across the surface of the liner. After approximately 1 minute the box was turned back upside down and the lid was tapped to remove loose microspheres on the liner. The coated liner and lid was removed and placed in an oven at 135° C. for 2 minutes to fully sink the micropheres in the polyethylene layer to form a transfer article. The transfer article comprised a random ordering of microspheres on the surface of the transfer article.

Preparation of a Decorative Article

The transfer article (from above) was then taped to a silicone coated polyester release liner and the exposed microspheres were overcoated with a 5 mil thick (127 micrometers) two-part urethane coating with a polyester substrate (3-mil thick (76.2 micrometer)), which were applied simultaneously using a notch bar coater. The two-part polyurethane was prepared by mixing DESMODUR N3300 polyisocyanate (10 grams) and KFLEX K188 polyol (12.04 grams) in a ratio giving a 5% excess of isocyanate groups (Index 1.05). A T-12 catalyst (67 microliters) was added together with other components and mixed in a FlackTek Speedmixer DAC 150 FV; both from Flac Tec Incorporated, Landrum, S.C. at 3450 rpm for 30 seconds. The polyurethane-coated multilayered article was cured in an oven at 70° C. for 1 hour and set aside for 24 hours. The multilayered article was pulled apart between the polyethylene and polyurethane layers, exposing the plurality of microspheres now embedded in the polyurethane layer. The resulting decorative article had an ordered mono-layered array of microspheres partially embedded (>50%) in a tough, hard polyurethane film with a 3-mil thick (76.2 micrometer) polyester substrate disposed on the opposing surface of the polyurethane layer.

Examples 1 and 1A (EX1-EX1A)

EX1 was a patterned microsphere-containing article prepared according to the Preparation of Patterned Microsphere Monolayer Transfer Article using SPG Print Screen #0 and ZGC 100 beads. The polyethylene transfer liner was 1 mil (25 micrometer) thick polyethylene layer on 3.8 mil (96.5 micrometer) polyester film with a 2 minute sink time.

EX1A was prepared by per the Preparation of a Decorative Article using EX1 as the transfer article. The top surface of EX1A was analyzed following the Method for Profilometry Measurements and FIG. 2 is the schematic representation of those results.

Examples 2 and 2A (EX2-EX2A)

EX2 and EX2A were prepared in the same manner as EX1 and EX1A, respectively, except that an SPG Print Screen #1 and ZGC 75 beads were used.

Examples 3 and 3A (EX3-EX3A)

EX3 and EX3A were prepared in the same manner as EX2 and EX2A, respectively, except that an SPG Print Screen #3 was used.

Comparative Examples 4 and 4A (CEX4-CEX4A)

CEX4 was a random microsphere-containing article prepared according to the Preparation of Random Microsphere Monolayer Transfer Article using ZGC 75 beads. The polyethylene transfer liner was a 2-mil (50 micrometer) thick polyethylene layer on 3.8-mil (96.5 micrometer) thick polyester film and a sink time of 2 minutes was used.

CEX4A was prepared by per the Preparation of a Decorative Article using EX4 as the transfer article.

Comparative Examples 5 and 5A (CEX5-CEX5A)

CEX5 and CEX5A were prepared in the same manner as CEX4 and CEX4A, respectively, except that ZGC 100 beads were used.

Examples 6 and 6A (EX6-EX6A)

EX6 and EX6A were prepared in the same manner as EX1 and EX1A, respectively, except that an SPG Print Screen #2 and RDL beads were used.

Examples 7 and 7A (EX7-EX7A)

EX7 and EX7A were prepared in the same manner as EX6 and EX6A, respectively, except that polyethylene transfer liner having 2-mil (50 micrometer) thick polyethylene layer on 3.8-mil (96.5 micrometer) thick polyester film and a sink time of 6 minutes was used.

Examples 8 and 8A (EX8-EX8A)

EX8 and EX8A were prepared in the same manner as EX7 and EX7A, respectively, except that polyethylene transfer liner having 4-mil (100 micrometer) thick polyethylene layer on 3.8-mil (96.5 micrometer) thick polyester film was used.

Comparative Examples 9 and 9A (CEX9-CEX9A)

CEX9 and CEX5A were prepared in the same manner as EX6 and EX6A, respectively, except that SPG Print Screen #4 was used.

Comparative Examples 10 and 10A (CEX10-CEX10A)

CEX10 and CEX10A were prepared in the same manner as CEX9 and CEX9A, respectively, except that polyethylene transfer liner having 2-mil (50 micrometer) thick polyethylene layer on 3.8-mil (96.5 micrometer) thick polyester film and a sink time of 6 minutes was used.

Examples 11 and 11A (EX11-EX11A)

EX11 and EX11A were prepared in the same manner as EX8 and EX8A, respectively, except that SPG Print Screen #4 was used.

Comparative Example 12 (CEX12)

CEX12 was a two-part polyurethane film coated on a 3-mil (75 micrometer) polyester film. The polyurethane had the same formulation as that used for overcoating described in the Preparation of a Decorative Article described above.

Comparative Example 13 (CEX13)

CEX13 was a 3-mil thick polyester film.

Comparative Example 14 and 14A (CEX14-CEX14)

CEX14 and CEX14A were prepared in the same manner as CEX4 and CEX4A, respectively, except that RDL beads were used, and the polyethylene transfer liner was a 4-mil (100 micrometer) thick polyethylene layer on 3.8-mil (96.5 micrometer) thick polyester film and a sink time of 6 minutes was used.

The examples and comparative examples were characterized using the test methods described above and the results are shown in Tables 1-2. Shown in Tables 1 and 2 are the average microsphere diameter which was determined by viewing the RDL beads and ZGC beads (unbedded) under a microscope and taking the average of three microspheres. The average distance between the apex of the microspheres (ctc) in the examples and comparative examples was determined by the Method for Microscopy Test using at least three different pairs of microspheres. The average microsphere height (h) in the examples and comparative examples was measured looking at the average of at least three microspheres using the Method for Profilometry Measurement. The average microsphere height (h) was divided by the average distance between ratio the apex of the microspheres (ctc) to determine the h:ctc ratio. The measured microsphere diameter at polymer surface was calculated as follows. The examples and comparative examples were analyzed using the Method for Profilometry Measurement to determine the height of the microsphere from the polymer surface (e.g., bead bonding layer). Knowing this data and the diameter of the microspheres initially used, the microsphere diameter at the polymer surface was calculated. The percent surface coverage of the microspheres was determined by using the microsphere diameter at polymer surface and calculating the surface area of the microsphere and dividing this value by the total surface area. Pencil hardness was determined following the Method for Determining Pencil Hardness. Friction coefficient was determined following the Method for Coefficient of Friction Testing. Ra was determined following Method for Retro-Reflectivity Test. Taber abrasion was determined following Method for Taber Abrasion Test. N/A used in the tables means not applicable.

TABLE 1

| | Example | | | | | | |
|---|---|---|---|---|---|---|---|
| | EX1A | EX2A | EX3A | CEX4A | CEX5A | EX6A | EX7A |
| Microsphere used | ZGC 100 | ZGC 75 | ZGC 75 | ZGC 75 | ZGC 100 | RDL | RDL |
| Description | patterned | patterned | patterned | random | random | patterned | patterned |
| Average Microsphere Diameter, μm | 100 | 80 | 80 | 80 | 100 | 160 | 160 |
| ctc, μm | 151 | 123 | 131 | N/A | N/A | 310 | 310 |
| h, μm | 19.8 | 23.1 | 17.9 | 19.1 | 17.1 | 18.8 | 32.7 |
| h:ctc ratio | 0.13 | 0.19 | 0.14 | N/A | N/A | 0.06 | 0.11 |
| Microsphere Diameter at Polymer Surface, μm | 81.20 | 76.40 | 71.40 | 70.8 | 73.70 | 109.25 | 135.50 |
| Surface Coverage, % | 27.37 | 30.42 | 24.60 | 0.0 | 0.0 | 11.40 | 16.03 |
| Pencil Hardness | 10H | 10H | 10H | 10H | 10H | 6H | 8H |
| Friction Coefficient | 0.10 | 0.09 | 0.09 | 0.14 | 0.13 | 0.10 | 0.13 |
| Ra Candelas/square meter/lux | 0.09 | 0.24 | 0.19 | 0.12 | 0.13 | 0.18 | 0.17 |
| Taber Abrasion | 2 | 2 | 2 | 1 | 1 | 3.5 | 2.5 |

TABLE 2

| | Example | | | | | | |
|---|---|---|---|---|---|---|---|
| | EX8A | CEX9A | CEX10A | EX11A | CEX12 | CEX13 | CEX14A |
| Microsphere used | RDL | RDL | RDL | RDL | Film | Film | RDL |
| Description | patterned | patterned | patterned | patterned | N/A | N/A | random |
| Average Microsphere Diameter, μm | 160 | 160 | 160 | 160 | N/A | N/A | 160 |
| ctc, μm | 310 | 407 | 405 | 405 | N/A | N/A | 188 |
| h, μm | 66.3 | 21.1 | 31.9 | 58 | N/A | N/A | 49.6 |
| h:ctc ratio | 0.21 | 0.05 | 0.08 | 0.14 | N/A | N/A | 0.26 |
| Microsphere Diameter at Polymer Surface, μm | 178.80 | 116.40 | 133.90 | 171.60 | N/A | N/A | 158 |
| Surface Coverage, % | 22.21 | 6.97 | 9.23 | 12.48 | N/A | N/A | 63.7 |
| Pencil Hardness | 10H | 2H | 2H | 4H | 4B | 8B | 10H |
| Friction Coefficient | 0.12 | 0.14 | 0.13 | 0.13 | N/A | 0.13 | 0.13 |
| Ra Candelas/square meter/lux | 0.17 | 0.16 | 0.21 | 0.19 | N/A | N/A | 0.27 |
| Taber Abrasion | 1.5 | 4 | 2.5 | 3 | 5 | 5 | 1 |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A decorative article comprising:
    a microsphere layer comprising a plurality of microspheres, wherein the microsphere layer comprises a monolayer of microspheres and wherein the plurality of microspheres are in a microscopic periodic pattern and wherein the microspheres consist of at least one of glass, ceramic or glass ceramic, wherein the ceramic consists of oxide materials selected from the group consisting of silicon dioxide, boron oxide, phosphorous oxide, aluminum oxide, germanium oxide, tin oxide, zinc oxide, bismuth oxide, titanium oxide, zirconium oxide, lanthanide oxides, barium oxide, strontium oxide, and combinations thereof, nonoxide materials selected from the group consisting of carbide, boride, nitride and silicide, and combinations thereof, or combinations of the oxide materials and nonoxide materials thereof, wherein the glass ceramic is based on lithium disilicate; and a bead bonding layer disposed on the microsphere layer wherein the beading bonding layer comprises an organic polymeric material, wherein the plurality of microspheres are partially embedded in the bead bonding layer wherein the plurality of microspheres are partially embedded to at least 50% of the microsphere diameter in the bead bonding layer; and wherein the plurality of microspheres covers more than 10% and less than 50% of the surface of the bead bonding layer, and wherein the surface of the decorative article comprising the exposed microspheres has a coefficient of friction less than 0.3 as measured by the Method for Coefficient of Friction Testing.

2. The decorative article of claim 1, wherein the plurality of microspheres has a microsphere height, which is the average vertical height from the surface of the bead bonding layer to the apex of the microspheres, wherein a ratio of microsphere height to microsphere center-to-center distance is greater than 0.1 and less than 0.5.

3. The decorative article of claim 1, wherein the plurality of microspheres covers more than 20% and less than 30% of the surface of the bead bonding layer.

4. The decorative article of claim 1, wherein the distance between nearest neighbors in plurality of microspheres is ⅛ to 5 times the average diameter of the microspheres.

5. The decorative article of claim 1, wherein the microspheres in the plurality of microspheres have an index of refraction of less than 1.55.

6. The decorative article of claim 1, wherein the monolayer of microspheres further comprises a macroscopic pattern.

7. The decorative article of claim 1, wherein the microscopic periodic pattern comprises a repeat unit selected from at least one of triangular, quadrilateral, pentagonal, hexagonal, or combinations thereof.

8. The decorative article of claim 1, further comprising a substrate, wherein the bead bonding layer is disposed between the substrate and the microsphere layer.

9. The decorative article of claim 8, wherein the substrate comprises at least one of a metal, fabric, polymeric films or sheets, paper, and combinations thereof.

10. The decorative article of claim 1, wherein the microspheres in the plurality of microspheres have a Knoop hardness of 1300 kgf/m$^2$.

11. The decorative article of claim 1, wherein the bead bonding layer comprises at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, neoprene, acrylonitrile butadiene copolymers, polymer matrix composites, and combinations thereof.

12. The decorative article of claim 1, wherein there exists a straight line across the surface of the microsphere layer substantially free of microspheres.

13. The decorative article of claim 1, wherein a transfer polymer layer is disposed onto the surface of the decorative article comprising the exposed microspheres, wherein the plurality of microspheres is disposed between the transfer polymer layer and the bead bonding layer.

14. The decorative article of claim 1, wherein the decorative article has a pencil hardness of at least 3H at a force of 2.5 Newtons.

15. The decorative article of claim 1, wherein the decorative article has a pencil hardness of at least 6H at a force of 2.5 Newtons.

16. The decorative article of claim 1, the plurality of microspheres are partially embedded to at least 60% of the microsphere diameter in the bead bonding layer.

17. The decorative article of claim 1, wherein the microspheres in the plurality of microspheres have a size difference of no more than 40%.

18. The decorative article of claim 1, wherein the plurality of microspheres in the microscopic periodic pattern are in two dimensional pattern.

19. The decorative article of claim 1, wherein a pattern in the microscopic periodic pattern are repeated across the width and the length of the decorative article.

* * * * *